No. 664,968. Patented Jan. 1, 1901.
J. A. PARKER.
DOUBLE SEAMING MACHINE FOR CLOSING EDGES OF COMPASITE BOARDS.
(Application filed May 16, 1900.)
(No Model.) 5 Sheets—Sheet 1.
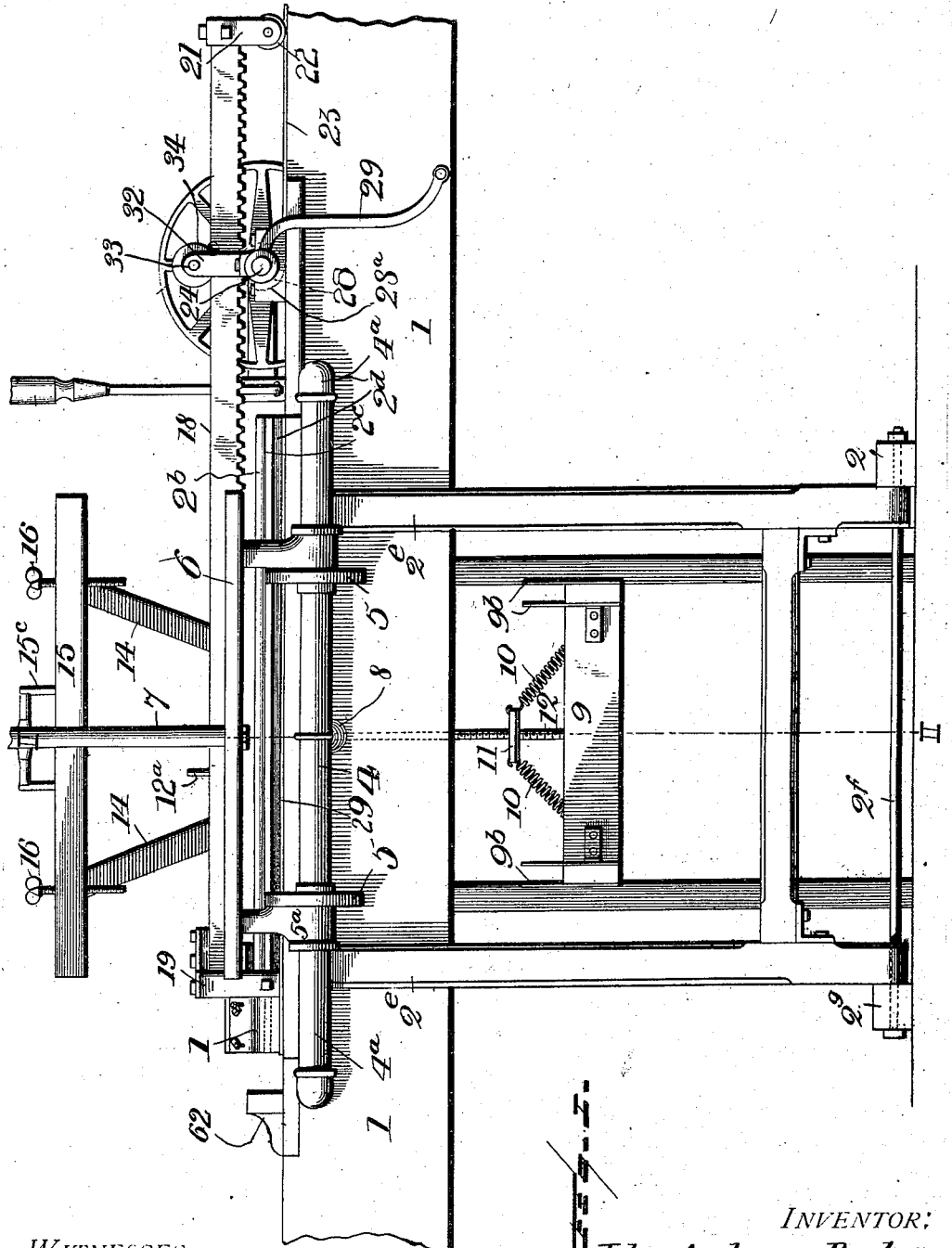
WITNESSES:
L. C. Hills
Walter Allen
INVENTOR:
John Anderson Parker;
BY
Knight Bros
Attorneys

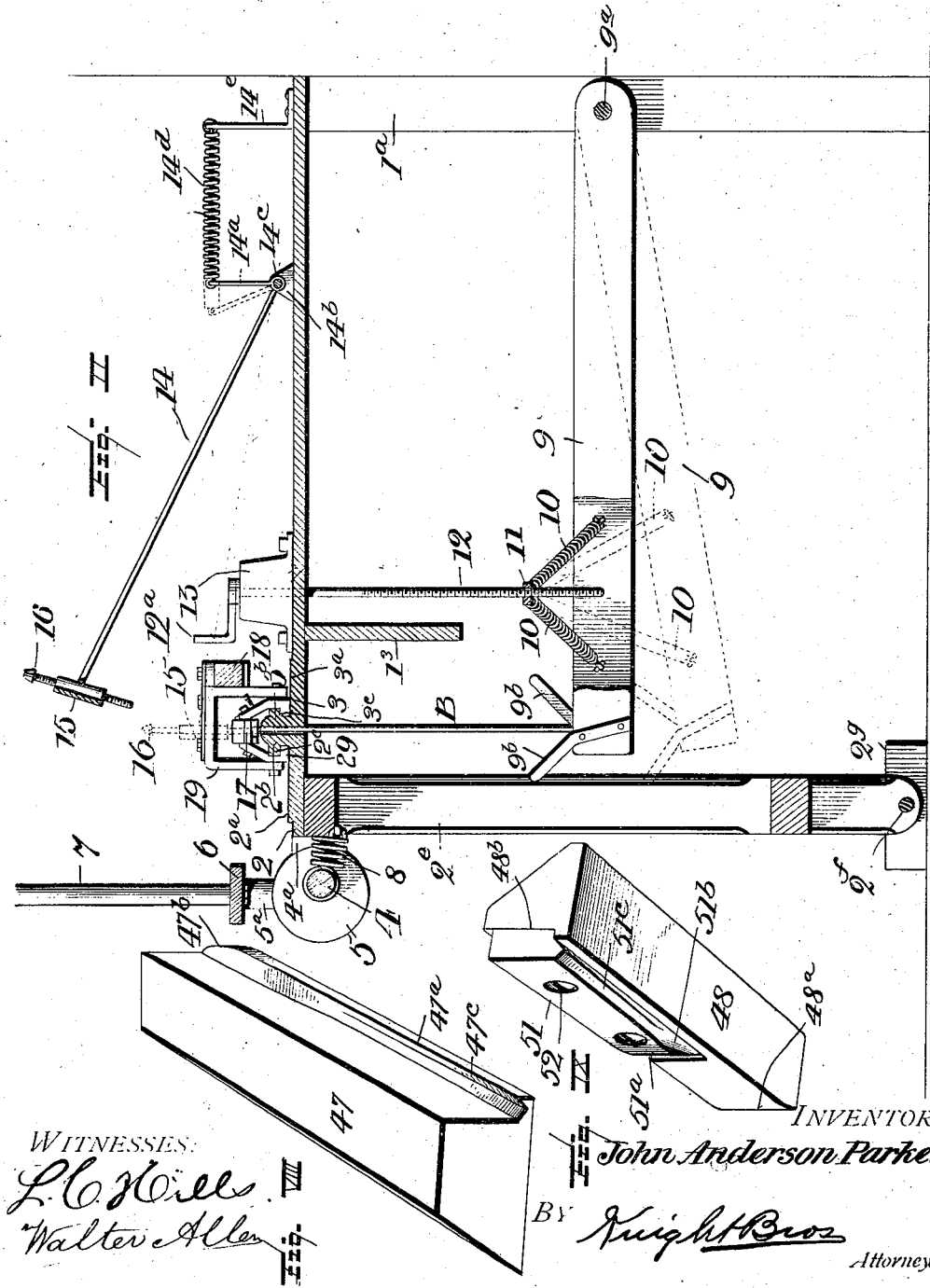

No. 664,968. Patented Jan. 1, 1901.
J. A. PARKER.
DOUBLE SEAMING MACHINE FOR CLOSING EDGES OF COMPOSITE BOARDS.
(Application filed May 16, 1900.)
(No Model.) 5 Sheets—Sheet 3.
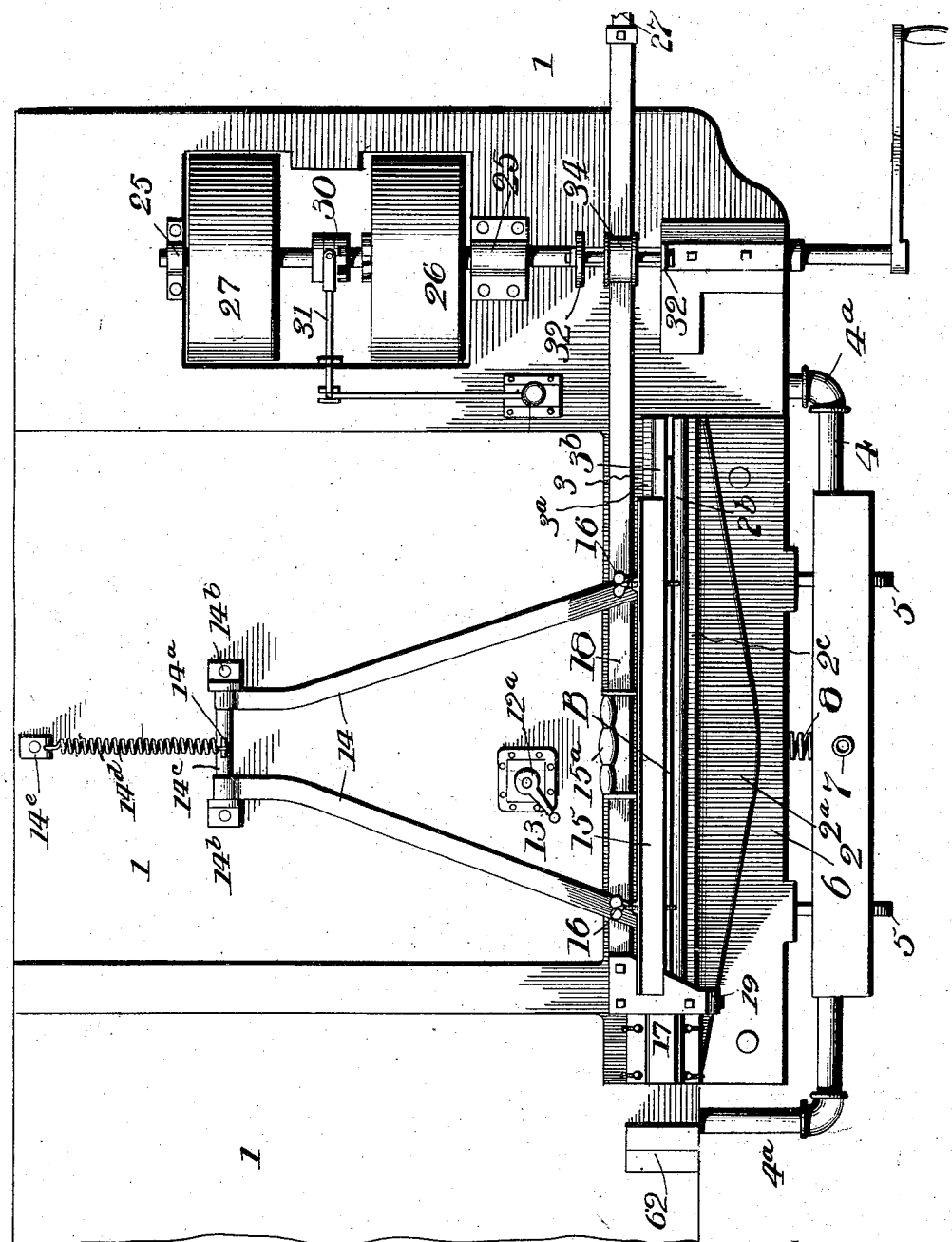
WITNESSES:
L. C. Hills
Walter Allen
INVENTOR.
John Anderson Parker
By
King & Bro. Attorneys

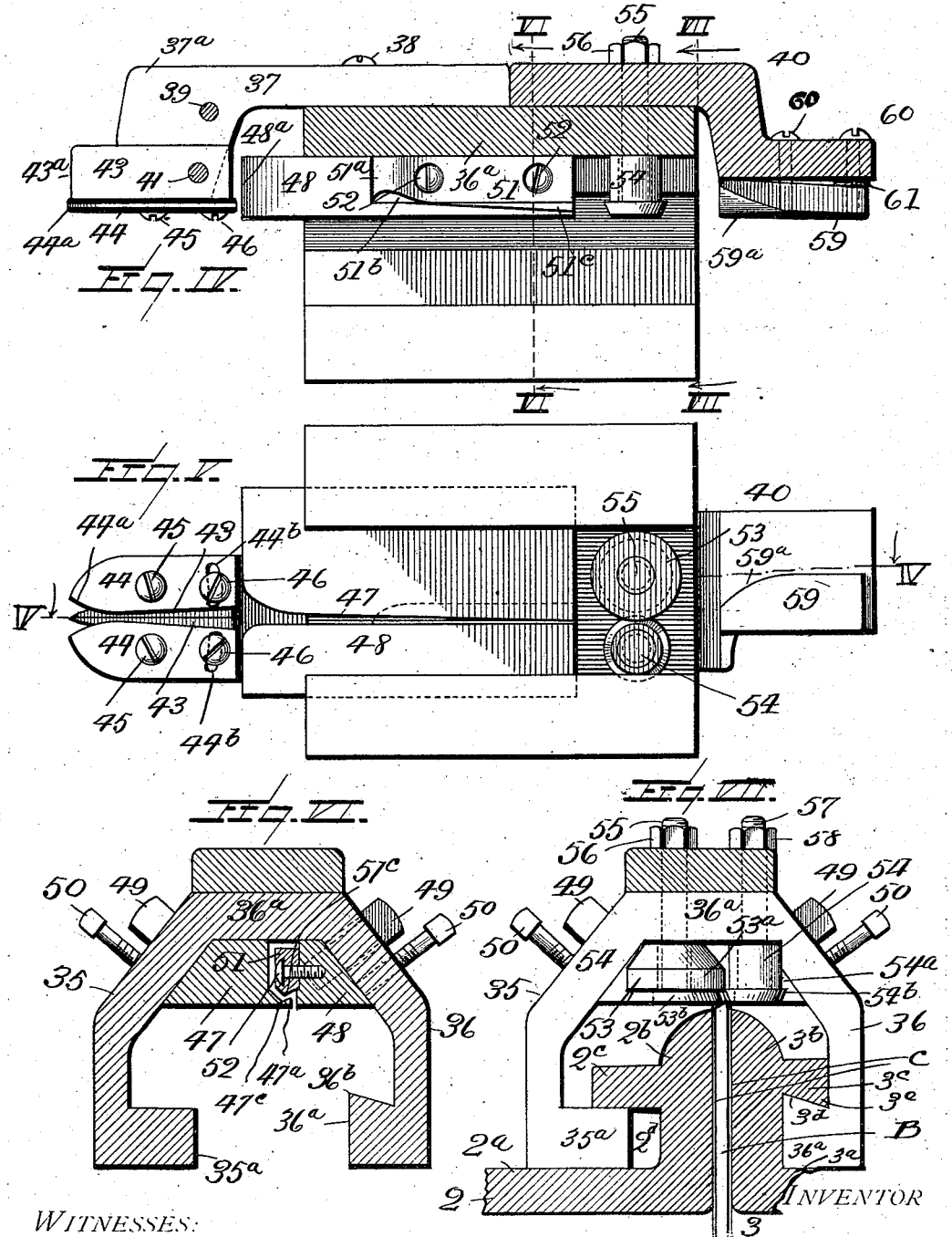

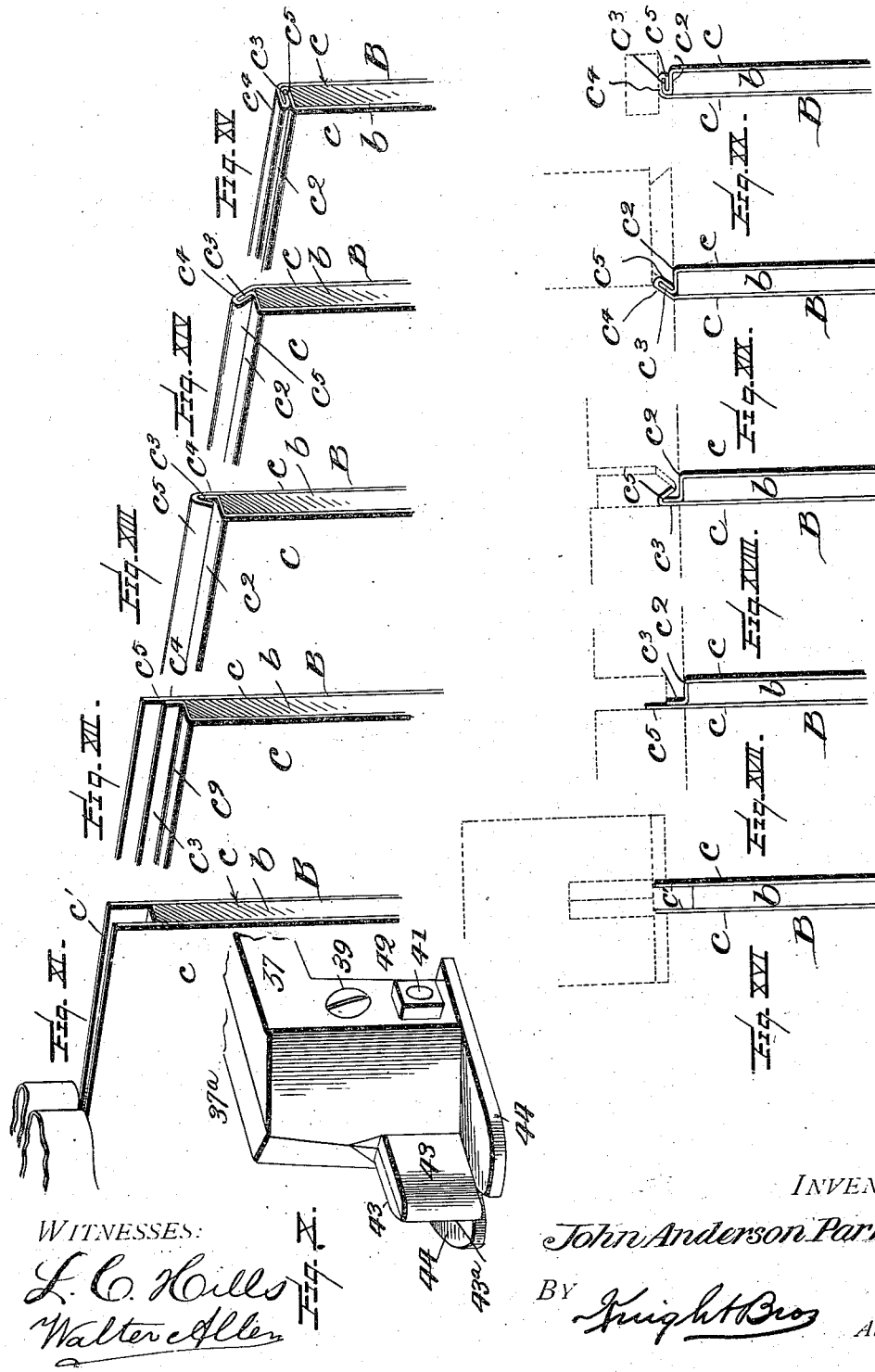

UNITED STATES PATENT OFFICE.

JOHN ANDERSON PARKER, OF BELLEFONTAINE, OHIO.

DOUBLE-SEAMING MACHINE FOR CLOSING EDGES OF COMPOSITE BOARDS.

SPECIFICATION forming part of Letters Patent No. 664,968, dated January 1, 1901.

Application filed May 16, 1900. Serial No. 16,872. (No model.)

*To all whom it may concern:*

Be it known that I, JOHN ANDERSON PARKER, a citizen of the United States, and a resident of Bellefontaine, in the county of Logan and State of Ohio, have invented certain new and useful Improvements in Double-Seaming Machines for Closing or Locking the Edges of Composite Boards, of which the following is a specification.

My improvements relate to a double-seaming machine more particularly intended for use in closing or locking the edges of my improved composite boards shown, described, and claimed in United States Letters Patent No. 648,632, granted to me May 1, 1900.

My machine comprises means for clamping the board, means for yieldingly supporting the board, means for centering the board, means for trimming the flanges of the facing-plates, means for interlocking the flanges, means for turning the flanges inward toward the filling, means for closing the flanges, and means for turning down the flanges.

In order that my invention may be fully understood, I will proceed to describe it with reference to the accompanying drawings, in which—

Figure I is a front elevation of my improved double-seaming machine for closing or locking the edges of composite boards, the die-head being in its forward position and the jaws open ready to receive a board after the die-head is returned to normal position. Fig. II is a vertical transverse section thereof on the line II II, Fig. I, the lower position of the lower gate and the gage being shown in dotted lines. Fig. III is a top plan view of the machine. Fig. IV is a vertical longitudinal section of the die-head on the line IV IV, Fig. V, looking in the direction of the arrows. Fig. V is a bottom view of the die-head. Fig. VI is a vertical transverse section of the die-head on the line VI VI, Fig. IV, looking in the direction of the arrows. Fig. VII is a vertical transverse section of the die-head on the line VII VII, Fig. IV, looking in the direction of the arrows. Fig. VIII is a perspective view of the female seaming-die. Fig. IX is a perspective view of the male seaming-die and small folding-die secured thereto. Fig. X is a perspective view of the cutting-dies. Fig. XI is a detail perspective view of the board, showing edges partly cut or trimmed by the cutting-dies. Fig. XII is a detail perspective view of the board, showing the first step in seaming. Fig. XIII is a similar view showing the second step in seaming. Fig. XIV is the third step in seaming. Fig. XV is the fourth step in seaming. Fig. XVI is an edge view of that shown in Fig. XI. Fig. XVII is an edge view of that shown in Fig. XII. Fig. XVIII is an edge view of that shown in Fig. XIII. Fig. XIX is an edge view of that shown in Fig. XIV. Fig. XX is an edge view of that shown in Fig. XV.

1 is a bench providing a support for my seaming-machine.

B is one of my improved composite boards forming the subject-matter of my Letters Patent hereinbefore referred to, having a straw-board filling $b$ and tin facing-plates $c$ secured thereto by adhesive material. The facing-plates $c$ have side and end flanges $c'$ projecting beyond the filling, which it is the object of my machine to form into double seams for the purpose of closing the edges of the facing-plates and hermetically sealing the filling, as hereinafter described.

My machine is provided with a vise in which the board is clamped while undergoing the operation of double-seaming the flanges of the facing-plates. This vise comprises a front movable jaw and a back fixed jaw. The front jaw is formed with a base-plate 2, a slideway $2^a$ thereon, and a vertical lip $2^b$, surmounting the slideway and having a side fin $2^c$, providing a deep groove $2^d$, Fig. VII, between the base-plate 2 and the fin side $2^c$. The front jaw 2 is mounted on the upper end of a hinged frame $2^e$, pivoted by a rod $2^f$ to bearing-blocks $2^g$. The back jaw is also formed with a base-plate 3, a slideway $3^a$, and a vertical lip $3^b$, surmounting the slideway $3^a$ and having a side fin $3^c$ and a pendent tongue $3^e$, providing an undercut groove $3^d$. This fixed jaw is securely fastened to the top of the bench.

4 is a shaft supported in the brackets $4^a$, rigidly secured to the bench. Mounted on this shaft 4 are a pair of cam-disks 5, provided with radial arms $5^a$, which are bolted to a frame 6, having a handle 7 also bolted thereto, whereby the cam-disks may be rotated to either close the movable jaw against the fixed jaw or to permit it to open. The shaft 4 is connected with the upper end of the hinged frame 2ᶜ by means of a coil-spring 8, which is adapted to pull the movable jaw away from the fixed jaw when the cam-disks 5 are brought away from the movable jaw by raising the handle 7.

9 is a yielding supporting-frame for the board, located beneath the top of the bench and hinged by a rod 9ᵃ to the rear support of the bench. The front end of the board-supporting frame is provided with pairs of upward-inclined guide-arms 9ᵇ for seating the board edge upon the front end of the board-supporting frame. The outer part of this board-supporting frame is suspended on coil-springs 10, having their upper ends connected to a nut 11, in which works a pendent screw-threaded rod 12, journaled at its upper end in a bearing-block 13, bolted to the top of the bench.

12ᵃ is a crank-handle whereby the pendent rod is rotated to raise the nut 11, and consequently causes the adjustment of the board-supporting frame 9.

14 is a forwardly-extending gage-frame having an arm 14ᵃ and hinged to bearings 14ᵇ on the bench by means of a rod 14ᶜ. The front end of this gage-frame 14 carries a gage-plate 15, which is used for positioning with a board. This gage-plate is provided with a handle 15ᵃ and is limited in its downward movement by the provision of adjustable check-bolts 16, which are so arranged as to impinge against one of the jaws for setting the gage. The gage-frame is held up in its normal position by means of a coil-spring 14ᵈ, connected at one end to the arm of the gage-frame and at the other end to a bracket 14ᵉ, bolted to the back of the bench.

17 is a sliding die head or block, hereinafter described in detail, embracing the side lips 2ᵇ and 3ᵇ of the jaws and adapted to slide forth and back on the slideways 2ᵃ and 3ᵃ. This die-head 17 is advanced and returned by means of a rack-bar 18, connected and supported at its forward end by means of a yoke-frame 19, securely bolted to the die-head, and at its rear end to a carriage 21, mounted on a grooved roller 22, traveling on a track 23.

24 is a power-shaft mounted on bearings 25 and carrying a fast pulley 26, a loose pulley 27, a pinion 28, meshing with the teeth of the rack-bar 18, a crank-handle 29, and a clutch 30, opened and closed by a clutch-lever 31. Located on opposite sides of the rack-bar 18 are brackets 32, in which is mounted a shaft 33, carrying a grooved roller 34 for holding down the rack-bar to the pinion 28.

Referring now to the die head or block 17, this die-head is constructed with a body of approximately arch form, with a front wall or cheek 35, formed with an inwardly-projecting tongue 35ᵃ, adapted to work in the deep groove 2ᵈ of the movable jaw, while permitting the jaw to open, owing to the depth of the groove 2ᵈ being greater than the depth of the tongue 35ᵃ. The rear wall or cheek 36 is constructed with an inwardly-projecting tongue 36ᵃ, having an upward half-dovetail projection 36ᵇ and adapted to fit in the undercut groove 3ᵈ and to work therein. The die-block is provided with a pair of forward brackets 37, removably secured thereto by screws 38, the brackets 37 being fastened together by a bolt 39. 40 is a rear bracket also secured to the die-block. Rigidly fastened, by means of a transverse bolt 41 and nut 42, between the forward brackets 37 are a pair of vertically-arranged cutters or knives 43, having rounded ends 43ᵃ, adapted to pass between the upwardly-extending flanges c' of the facing-plates c of a board.

44 indicates a pair of horizontal cutters or knives having rounded forward ends 44ᵃ, secured by pivot-screws 45 to the under side of the nose 37ᵃ of the forward brackets 37, flush with the bottom edge of the vertical cutters 43. The rear ends of the horizontal cutters 44 are formed with slots 44ᵇ, through which pass clamping-screws 46, thus providing means whereby the forward ends 44ᵃ of the horizontal cutters 44 may be adjusted with relation to the forward ends 43ᵃ of the vertical cutters 43. Secured within the crown 36ᵃ of the die-block, in rear of the cutters, is a pair of fixed female and male seaming-dies 47 48, secured and held adjustably by screw-bolts 49 and set-screws 50. The female die 47 is formed with a ledge 47ᵃ, having a vertically-rounded forward end 47ᵇ and a V-shaped groove 47ᶜ in the upper surface of the ledge 47ᵃ, extending rearwardly and gradually increasing in depth from said forward end 47ᵇ of the ledge 47ᵃ to the rear end of the latter. The male die 48 has a vertical forward end 48ᵃ slightly rounded and a recess 48ᵇ for an auxiliary or small die 51, removably secured by screws 52 to the male die. This small die 51 projects over the ledge 47ᵃ of the female die and is formed with a rounded forward end 51ᵃ and a cam-face 51ᵇ beneath the rounded forward end 51ᵃ and with a V-shaped tongue 51ᶜ gradually increasing in height from the cavity in the rear end of the small die and projecting over the ledge in such manner as to leave a correspondingly-shaped channel between the V-shaped groove 47ᶜ and the tongue 51ᶜ.

53 54 are a pair of circular female and male intermeshing dies positioned in rear of the fixed dies for closing the flanges. The female die 53 is formed with a rotatable head 53ᵃ, having an acute-angular groove 53ᵇ, and is mounted on a pendent screw-threaded stud 55, extending through the crown 36ᵃ of the die-block and through the rear bracket 40, and is secured by a nut 56. The male die 54 is constructed with a rotatable head 54ᵃ, having an acute-angular flange 54ᵇ, corresponding to the acute-angular groove 53ᵇ of the female circular die 53. The male circular die 54 is mounted on a screw-threaded pendent stud 57, also extending through the crown 36ª of the die-block and through the rear bracket 40, and is secured by a nut 58. The rear bracket 40 is chiefly intended to provide a support for a drag-die 59 for turning down the flanges, secured to the depressed part of the rear bracket by means of screws 60. This drag-die 59 is formed with a rounded inner end 59ª, located in rear of the circular dies 53 54. The rear end of the drag-die 59 can be depressed, if desired, by means of a washer 61, located around the rear screw 60, between it and the bracket 40.

62 is a bracket bolted to the bench in advance of the die 17 to provide a stop for limiting the forward movement of the die-head.

In operating my machine the handle 7 is raised, so as to cause the spring to pull on the hinged frame 2ᵉ and open the movable jaw, the die-head 17 being in its rear position. The movable jaw being open, the board to be seamed is inserted between the jaws and guided into proper position on the yielding supporting-frame 9 by the guide-arms 9ᵇ. The handle 12ª of the frame-rod 12 is now taken hold of, so as to turn the rod 12 and adjust the supporting-frame at desired height, so that the flange c' of the facing-plates c will project above jaws the proper distance to be trimmed down to the correct height. The gage 15 is next brought down for aiding in locating the board properly between the jaws before the movable jaw is closed. The handle 7 is now lowered, so that the cams 5 bear against the movable jaw and clamp the board between the jaws. The die-head is advanced by the action of the power-shaft upon the rack-bar, and the rounded ends 43ª of the vertical cutter 43 pass between the flanges, and the rounded ends 44ª of the horizontal cutters 44 pass on the outer side of the flanges, as indicated in Fig. XVI, and the continued advance of the die-head causes the cutters to trim the flanges and remove the ribbons, as shown in Fig. XI. The seaming-dies 47 and 48 following the cutters, the rounded forward end 47ᵇ of the ledge 47ª of the female die 47 comes in contact with the flange of the inner facing-plate and folds the inner part $c^2$ of the inner flange down onto the filling b and the outer part $c^3$ of the inner flange against the inner part $c^4$ of the outer flange, which is supported by the forward end 48ª of the male die 48, as indicated in Figs. XVII and XII. The outer part $c^5$ of the outer flange now passes beneath the cam-face 51ᵇ of the small die and is turned inward over the inward part $c^3$ of the inner flange and these parts gradually folded together in the channel between the V-shaped groove 47ᶜ and the V-shaped tongue 51ᶜ and interlocked, as indicated in Figs. XVIII and XIII. The inturned flanges next enter the channel between the acute-angular groove 53ᵇ of the head 53ª of the circular die 53 and the acute-angular flange 54ᵇ of the head 54ª of the circular die 54, and the seamed flanges are closed together, as indicated in Figs. XIX and XIV. The drag-die 59 approaches the interlocked flanges, and its rounded inner end 59ª turns down the flanges, and they pass beneath the drag-die and are pressed against the inner part of the inner flange, as indicated in Figs. XX and XV, and the seaming edge of a board is completed.

It will be observed that the seaming of my composite boards is quickly accomplished by my machine, each stroke of the rack-bar causing the die-head to complete the seaming of one edge of a board in one movement of the die-head, and uniformity of work is produced. No mandrel is needed aside from the strawboard filling. The board is either dropped down or removed before the die-head is brought back to the starting-point. The cutters trim both facing-plates to a proper height above the strawboard filling, so that the flanges when folded up will be properly locked together. As to the height of the flanges above the filling, that will depend upon the thickness of the filling. If thicker, the front cutters are made to cut higher or cut longer flanges. The rounding forward end imparts a wedge shape to the cutters, so they will pass between the edges of the tin facing-plates easily. Especially is this necessary when the knives are starting into the work, as the tin flanges may be somewhat bent, not always being uniform. The rounding of the cutter-knives gives an outward coiling direction to the ribbons of scrap-tin being cut from the facing-plates. This is a very nice result in my construction, as it prevents the ribbons of tin-scrap from getting wound up under the dies or catching bolt-heads or projecting parts. The nose upon which these cutters are bolted fast are made to finish this coiling process of the ribbons of tin-scrap, the horizontal cutters being also rounded outwardly, so as to catch the edges of the tin readily when the cutters are brought up in contact therewith. This rounding shape allows for shifting the cutting contact. Sometimes the cutters get dull, as would be natural, and so by hinging the cutters on the front screws or bolts and slotting the cutters at the rear screws or bolts there is considerable allowance for adjusting and shifting the point of cutting contact provided. These cutters are made very hard, so as not to dull easily.

Having thus described my invention, the following is what I claim as new therein and desire to secure by Letters Patent:

1. A double-seaming machine comprising a vise in which the board is clamped, having a fixed jaw formed with a side fin, providing a groove, and a movable jaw formed with a side fin, providing a groove, a hinged frame upon which the movable jaw is mounted, means for closing and opening the movable jaw, and a sliding die-head embracing the jaws and formed with inwardly-projecting tongues adapted to work in the grooves of the jaws.

2. A double-seaming machine comprising a vise in which the board is clamped, having a fixed jaw formed with a side fin providing a groove and a movable jaw formed with a side fin providing a deep groove, a frame upon which the movable jaw is mounted, means for closing and opening the movable jaw, and a sliding die-head embracing the jaws and formed with inwardly-projecting tongues adapted to work in the grooves of the jaws; the deep groove permitting the movable jaw to be opened within the die-head.

3. A double-seaming machine comprising a vise, in which the board is clamped, having a fixed jaw formed with a side fin and pendent tongue providing an undercut groove, and a movable jaw formed with a side fin providing a deep groove, a frame upon which the movable jaw is mounted, means for closing and opening the movable jaw, and a sliding die-head embracing the jaws and formed with a front wall having an inwardly-projecting tongue, working in the deep groove and a rear wall having an inwardly-projecting tongue provided with an upward projection and working in the undercut groove, the deep groove permitting the movable jaw to be opened, and the undercut groove providing an interlock between the side fin on the fixed jaw and the tongue on the rear wall of the die-head.

4. A double-seaming machine comprising a vise having jaws in which the board is clamped, a sliding die-head embracing the jaws, a yoke-frame securely fastened to the die-head, and means connected with the yoke-frame for reciprocating the die-head.

5. A double-seaming machine comprising a vise having jaws in which the board is clamped, a sliding die-head embracing the jaws, a track, a rack-bar, means for connecting the rack-bar to the die-head, a carriage for supporting the other end of the rack-bar on the track, a power-shaft having a pinion meshing with the rack-bar, and means for operating the power-shaft.

6. A double-seaming machine comprising a vise having jaws in which the board is clamped, a sliding die-head embracing the jaws, means for connecting one end of the rack-bar to the die-head, a carriage for supporting the other end of the rack-bar, a power-shaft having a pinion meshing with the rack-bar, means for operating the power-shaft, brackets located on opposite sides of the rack-bar, and a shaft mounted in the brackets and carrying a roller for holding down the rack-bar to the pinion.

7. A double-seaming machine comprising a vise having jaws in which the board is clamped, a board-supporting hinged frame, having pairs of upwardly-inclined guide-arms for seating the board edge up, and means for supporting the hinged frame at desired height.

8. A double-seaming machine comprising a vise having jaws in which the board is clamped, a board-supporting hinged frame having pairs of upwardly-inclined guide-arms for seating the board edge up, a pendent screw-threaded rod, a bearing-block in which the upper end of the rod is journaled, an adjustable nut mounted on the rod, and coil-springs whereby the hinged frame is yieldingly supported on the rod by the adjustable nut.

9. A double-seaming machine comprising a vise having jaws in which the board is clamped, a board-supporting frame, and a gage-frame carrying a gage-plate for positioning the board, and adjustable check-bolts for setting the gage.

10. A double-seaming machine comprising a vise having jaws in which the board is clamped, a board-supporting frame, a gage-frame having an arm carrying a gage-plate and adjustable check-bolts, bearings, a rod whereby the gage-frame is hinged to the bearings, a bracket, and a coil-spring whereby the arm of the gage is connected with the bracket, for yieldingly supporting the gage-frame.

11. A die-head for a double-seaming machine comprising means for folding the inner part of the flanges of the inner facing-plate of a board against the filling of the board, and for folding the outer part of the inner flanges against the inner part of the flanges of the outer facing-plate of the board and means for folding the outer part of the outer flanges over the outer part of the inner flanges for interlocking the inner and outer flanges to provide a flanged board.

12. A die-head for a double-seaming machine comprising means for folding the inner part of the flanges of the inner facing-plate of a board against the filling of the board, and for folding the outer part of the inner flanges against the inner part of the flanges of the outer facing-plate of the board, means for folding the outer part of the outer flanges over the outer part of the inner flanges for interlocking the inner and outer flanges, and means for turning the interlocked flanges inward to provide a flanged board with a surrounding channel or trough.

13. A die-head for a double-seaming machine comprising means for folding the inner part of the flanges of the inner facing-plate of a board against the filling of the board, and for folding the outer part of the inner flanges against the inner part of the flanges of the outer facing-plate of the board, means for folding the outer part of the outer flanges over the outer part of the inner flanges for interlocking the inner and outer flanges, means for turning the interlocked flanges inward, and means for closing the interlocked flanges.

14. A die-head for a double-seaming machine comprising means for folding the inner part of the flanges of the inner facing-plate of a board against the filling of the board, and for folding the outer part of the inner flanges against the inner part of the flanges of the outer facing-plate of the board, means for folding the outer part of the outer flanges over the outer part of the inner flanges for interlocking the inner and outer flanges, means for turning the interlocked flanges inward, means for closing the interlocked flanges, and means for turning down the interlocked flanges.

15. A die-head for a double-seaming machine comprising means for trimming the flanges of the inner and outer facing-plates of a board, means for folding the inner part of the inner flanges against the filling of the board and for folding the outer part of the inner flanges against the inner part of the outer flanges, and means for folding the outer part of the outer flanges over the outer part of the inner flanges for interlocking the inner and outer flanges to provide a flanged board.

16. A die-head for a double-seaming machine comprising means for trimming the flanges of the inner and outer facing-plates of a board, means for folding the inner part of the inner flanges against the filling of the board and for folding the outer part of the inner flanges against the inner part of the outer flanges, means for folding the outer part of the outer flanges over the outer part of the inner flanges for interlocking the inner and outer flanges, and means for turning the interlocked flanges inward to provide a flanged board with a surrounding channel or trough.

17. A die-head for a double-seaming machine comprising means for trimming the inner and outer flanges of a board, means for folding the inner part of the inner flanges against the filling of the board and for folding the outer part of the inner flanges against the inner part of the outer flanges, means for folding the outer part of the outer flanges over the outer part of the inner flanges for interlocking the inner and outer flanges, means for turning the interlocked flanges inward, and means for closing the interlocked flanges.

18. A die-head for a double-seaming machine comprising means for trimming the flanges of the inner and outer facing-plates of a board, means for folding the inner part of the inner flanges against the filling of the board, and for folding the outer part of the inner flanges against the inner part of the outer flanges, means for folding the outer part of the outer flanges over the outer part of the inner flanges for interlocking the inner and outer flanges, means for turning the interlocked flanges inward, means for closing the interlocked flanges, and means for turning down the interlocked flanges against the inner part of the inner flanges.

19. A die-head for a double-seaming machine comprising a body of approximately arch form having a pair of forward brackets, fastened together and secured to the body to provide a nose, a pair of vertically-arranged cutters having rounded forward ends and secured between the nose parts of the forward brackets, and a pair of horizontally-arranged cutters secured to the under side of the nose.

20. A die-head for a double-seaming machine comprising a body, having a pair of forward brackets fastened together and secured to the body to provide a nose, a pair of vertically-arranged cutters having rounded forward ends and secured between the nose parts of the forward brackets, and a pair of horizontally-arranged cutters pivoted at the forward ends to the under side of the nose and adjustable at their rear ends.

21. A die-head for a double-seaming machine comprising a body and a pair of fixed female and male dies secured within the crown of the body; the female die being formed with a ledge having a vertically-rounded forward end for folding the inner part of the flanges of the inner facing-plate against the filler of the board and the outer part of the inner flanges against the flanges of the outer facing-plate and with a V-shaped groove in the upper surface of the ledge extending rearwardly and gradually increasing in depth from said forward end, and the male die being formed with a slightly-rounded vertical forward end for supporting the outer flange against the pressure of the female die, and with a recess and provided with a small die located in the recess of the male die, projecting over the ledge of the female die and formed with a rounded forward end and a cam-face beneath the rounded forward end for turning the outer flange and outer part of the inner flange inward and with a V-shaped tongue gradually increasing in height from the cavity to the rear end leaving a correspondingly-shaped channel between the V-shaped groove and the tongue.

22. A die-head for a double-seaming machine comprising a body and a pair of circular female and male intermeshing dies secured within the crown of the body; the female die being formed with a head having an acute-angular groove, and the male die being formed with an acute angular flange corresponding to the acute angular groove.

23. A die-head for a double-seaming machine comprising a body, a rear bracket having a depressed part, and a drag-die for turning down the seams formed with a rounded inner end and secured to the depressed part of the rear bracket.

24. A die-head for a seaming-machine comprising a body, a female die formed with a ledge having a vertically-rounded forward end, and a V-shaped groove, the male die having a slightly-rounded forward end and a recess, an auxiliary die formed with a rounded forward end, having a cam-face beneath it and with a V-shaped tongue, a circular female die having an acute-angular groove, a circular male die having an acute angular tongue and a drag-bar having a rounded inner end.

25. A die-head for a seaming-machine comprising a body, a pair of vertical cutters, a pair of horizontal cutters, a female die formed with a ledge having a vertically-rounded forward end, and a V-shaped groove, the male die having a slightly-rounded forward end and a recess, an auxiliary die formed with a rounded forward end, having a cam-face beneath it and with a V-shaped tongue, a circular female die having an acute-angular groove, a circular male die having an acute-angular tongue and a drag-bar having a rounded inner end.

26. A double-seaming machine comprising means for clamping the board, means for yieldingly supporting the board, means for centering the board, means for interlocking the flanges, means for turning the flanges inward toward the filling, means for closing the flanges, and means for turning down the flanges.

27. A double-seaming machine comprising means for clamping the board, means for yieldingly supporting the board, means for centering the board, means for trimming the flanges of the facing-plates, means for interlocking the flanges, means for turning the flanges inward toward the filling, means for closing the flanges, and means for turning down the flanges.

The foregoing specification signed at Bellefontaine, Ohio, this 15th day of May, 1900.

JOHN ANDERSON PARKER.

In presence of—
GERTRUDE ANDERSON,
JOHN E. WEST.